(12) United States Patent
Cochran et al.

(10) Patent No.: US 11,647,257 B2
(45) Date of Patent: May 9, 2023

(54) PAUSE PLAYBACK OF MEDIA CONTENT BASED ON CLOSED CAPTION LENGTH AND READING SPEED

(71) Applicant: INTERNATIONAL BUSINESS MACHINES CORPORATION, Armonk, NY (US)

(72) Inventors: Troy Cochran, Apex, NC (US); Nixon Cheaz, Cary, NC (US); James Talton, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/949,424

(22) Filed: Oct. 29, 2020

(65) Prior Publication Data

US 2022/0141541 A1   May 5, 2022

(51) Int. Cl.
*H04N 21/488* (2011.01)
*H04N 21/439* (2011.01)
*H04N 21/485* (2011.01)
*G06N 20/00* (2019.01)

(52) U.S. Cl.
CPC ......... *H04N 21/4884* (2013.01); *G06N 20/00* (2019.01); *H04N 21/4394* (2013.01); *H04N 21/4856* (2013.01)

(58) Field of Classification Search
CPC ........... H04N 21/4884; H04N 21/4394; H04N 21/4856; G06N 20/00
See application file for complete search history.

(56) References Cited

U.S. PATENT DOCUMENTS

| | | | |
|---|---|---|---|
| 7,826,714 B2 | 11/2010 | Berstis | |
| 2006/0002684 A1 | 1/2006 | Champel | |
| 2010/0232762 A1 | 9/2010 | Kendall | |
| 2017/0133060 A1 | 5/2017 | Wang | |
| 2018/0211556 A1* | 7/2018 | Sreedhara | G09B 17/04 |

(Continued)

OTHER PUBLICATIONS

Mell, et al., "The NIST Definition of Cloud Computing", National Institute of Standards and Technology, Special Publication 800-145, Sep. 2011, 7 pages.

(Continued)

*Primary Examiner* — Jefferey F Harold
*Assistant Examiner* — Franklin S Andramuno
(74) *Attorney, Agent, or Firm* — Alexis N. Hatzis

(57) ABSTRACT

A method, computer system, and a computer program product for playing a video recording that includes captions, wherein each caption includes a textual transcription of an audio portion of the video, a description of non-speech elements of the video, or both, is provided. The present invention may include rendering a video, identifying a first portion of the video that includes a first caption, and, in response to identifying the first portion of the video, estimating a second time period for a particular user to read and understand text in the first caption. The present invention may further include determining whether the second time period for the particular user to read and understand text in the first caption is greater than the first time period for rendering the first portion of the video. The present invention may lastly include pausing the video for a third time period.

14 Claims, 5 Drawing Sheets

(56) References Cited

U.S. PATENT DOCUMENTS

2018/0302687 A1* 10/2018 Bhattacharjee .... H04N 21/4884
2019/0377987 A1* 12/2019 Price ........................ G06N 3/08
2020/0051582 A1    2/2020 Gilson
2020/0396519 A1* 12/2020 Bardoux ................. G06F 3/167

OTHER PUBLICATIONS

Roe, "A Push for Closed Captioning in the Digital Age," Mediashift. org, [accessed on Oct. 27, 2020], 5 pages, Retrieved from the Internet: <URL: http://mediashift.org/2014/05/a-push-for-closed-captioning-in-the-digital-age/>.

Sanford, "How fast should subtitles be?", BBC R&D, Sep. 11, 2015 [accessed on Sep. 12, 2019], 6 pages, Retrieved from the Internet: <https://www.bbc.co.uk/rd/blog/2015-09-how-fast-should-subtitles-be>.

Statista, "Size of e-learning market in 2014 and 2022," Statista Research Department [online datasheet], Sep. 21, 2015 [accessed on Oct. 27, 2020], 2 pages, Retrieved from the Internet: <URL: https://www.statista.com/statistics/501104/worldwide-elearning-market-size/>.

Statista, "Video Streaming (SVoD)," Statista Market Forecast [online datasheet], [accessed on Oct. 27, 2020], 8 pages, Retrieved from the Internet: <URL: https://www.statista.com/outlook/206/100/video-streaming--svod-/worldwide#%20(Video%20streaming%20market%20size)>.

Troost, "Pause timeline when closed captioning toggled on?", Articulate Storyline Discussion—E-Learning Heroes, 5 pages, [accessed on Sep. 12, 2019], Retrieved from the Internet: <https://community.articulate.com/discussions/articulate-storyline/pause-timeline-when-closed-captioning-toggled-on>.

Washeck, "A Push for Closed Captioning in the Digital Age", [accessed on Sep. 12, 2019], Retrieved from the Internet: <http://mediashift.org/2014/05/a-push-for-closed-captioning-in-the-digital-age/>.

* cited by examiner

PAUSE PLAYBACK OF MEDIA CONTENT BASED ON CLOSED CAPTION LENGTH AND READING SPEED

BACKGROUND

The present invention relates generally to the field of computing, and more particularly to multimedia and image processing.

In closed captioned videos, the length of the closed captioned text may affect the comprehension of the material being presented. When a reading speed of the user is slow and/or when the closed captioned text is very knowledge dense (e.g., when the reading material is not easily comprehended), there may be a contextual loss of the material being presented.

SUMMARY

Embodiments of the present invention disclose a method, computer system, and a computer program product for playing a video recording that includes captions, wherein each caption includes a textual transcription of an audio portion of the video, a description of non-speech elements of the video, or both. The present invention may include rendering a video, identifying a first portion of the video that includes a first caption, and, in response to identifying the first portion of the video, estimating a second time period for a particular user to read and understand text in the first caption. The present invention may further include determining whether the second time period for the particular user to read and understand text in the first caption is greater than the first time period for rendering the first portion of the video. The present invention may lastly include pausing the video for a third time period.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
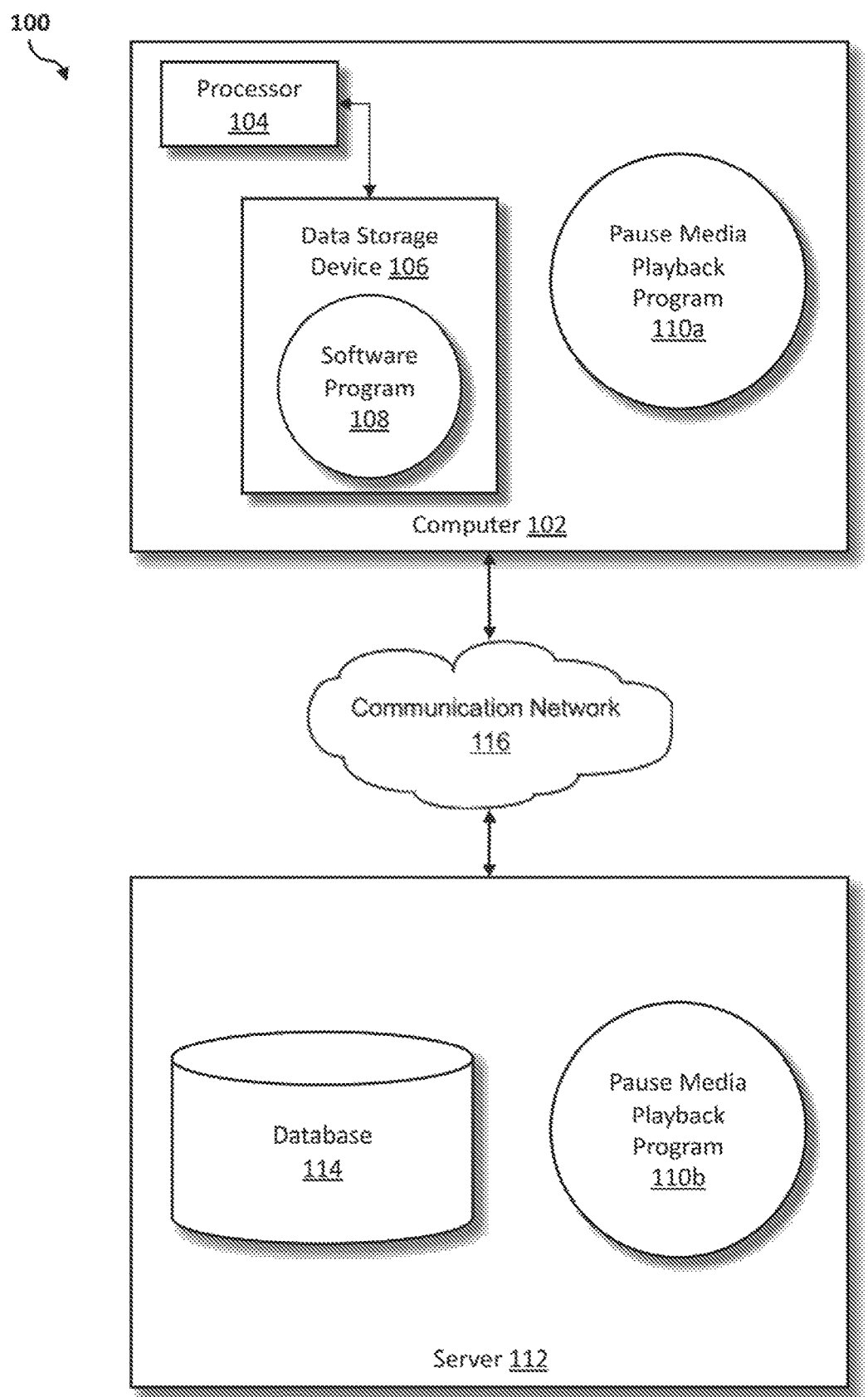
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for pause playback of media content based on closed caption length and reading speed. As such, the present embodiment has the capacity to improve the technical field of multimedia and image processing by automatically pausing video content based on a determined length of the closed captioning. More specifically, the present invention may include rendering a video, identifying a portion of the rendered video that includes a closed caption, estimating a time period for the user to read the closed caption, and using the estimated time period to estimate a second time period for the user to read a second closed caption.

As described previously, in closed captioned videos, the length of the closed captioned text may affect the comprehension of the material being presented. When a reading speed of the user is slow and/or when the closed captioned text is very knowledge dense (e.g., when the reading material is not easily comprehended), there may be a contextual loss of the material being presented.

Therefore, it may be advantageous to, among other things, provide a way to automatically pause the video based on the second estimated time period so that the user can read and comprehend the closed captioned text.

According to at least one embodiment, the pause media playback program may pause the playback of media content that has closed captions based on a user's reading speed. For example, content that is being displayed with closed captions which are determined to be too long for the user to read in a short time period, will be paused for the length of time it will take the user to read the closed captions (i.e., a target time). Once the target time has been reached, the video will be un-paused.

According to at least one embodiment, the length of time it will take the user to read the closed captions may be determined by learned usage of the user's reading speed and any metadata associated with the video (e.g., an originating language of the video, a closed caption language, and the subject matter of the video), among other things.

According to at least one embodiment, knowledge of the user may come from connected sources including, but not limited to, e-reader device accounts. Knowledge of the user may include a user's educational background, natural spoken language(s), and/or any language processing challenges.

According to at least one embodiment, the present invention may include a database of user profiles which may be hosted on a web-based service and/or locally on a computer mainframe and/or server. The database of user profiles may include a user profile for each user of the pause media playback program and may be accessed over a web-based platform using a user's login credentials (e.g., a username and password). The user profile may include user details including, but not limited to, a user's reading speed, education level, and/or native speaking language, among other things. The user profile may also be linked with (e.g., connected to, paired with) the user's online accounts, including, but not limited to, the user's Netflix (Netflix is a trademark or registered trademark of Netflix, Inc.) account, and Kindle (Kindle is a trademark or registered trademark of Amazon Technologies, Inc.) account. The user profile and any connected online accounts may be updated at any time after the user profile has been generated. According an embodiment, a user associated with a user profile can consent to providing his or her user personal details. In addition, the user associated with a user profile can consent to the use of his or her user personal details as described herein. Furthermore, according to various aspects of the embodiments, personal details of a user may be kept secret, encrypted, and/or used in a manner that maintains the privacy and secrecy of a user's personal details.

According to at least one embodiment, information gathered by a connected online account of the user may be shared with the pause media playback program. The sharing of information between connected online accounts may be based on a user's preference (and consent) to share such information (e.g., a user's indication within the pause media playback program and/or within a connected online account that information generated by one online account may be shared with another) and/or may be an optional condition of creating a user profile within the pause media playback program (e.g., to facilitate a rapid learning of the user's characteristics, abilities, and/or preferences).

According to at least one embodiment, a user profile may be mined to determine factors that correlate with a faster and/or slower reading speed. The user profile may not be the only personalization information which may be fed to a screen subtitle pause handler, but the collective, anonymized statistics of a group of other users of the same or similar content, who may have user profiles similar to the user, may be mined and fed to the screen subtitle pause handler as parameters used to fine tune an optimal length of time for to pause for each individual video viewer (i.e., user). Personalization information may be fed to a screen subtitle handler via a network connection to a profiler server.

According to at least one embodiment, collaborative filtering may be used to determine a user's reading speed based on whether the rendered video is technical, information dense, and/or is presented in a language which tends to have longer descriptive words, among other things. Collaborative filtering techniques may be applied to leverage video pause habits gathered from all users to predict and provide a recommended pause value for an individual user. This may be achieved based on data contained within the pause media playback program, including data which may be generated by connected online accounts. For example, collaborative filtering techniques may utilize a database of user data, wherein the user data may be manually and/or automatically tagged with certain parameters (e.g., classifications) which may represent, among other things, a user's native language, a user's occupation, a user's educational background, and a user's video pause habits (e.g., a time it takes a user to read a certain amount of words) as well as tagged parameters pertaining to the rendered video (e.g., spoken language of the rendered video, among other things). A system using collaborative filtering techniques may identify users with shared tagged parameters in order to predict a video pause length.

According to at least one embodiment, a user may manually pause the playback of a rendered video and the lengths of one or more manual pauses may be saved and used as additional data which may be fed back into the pause media playback program. The length of a manual pause may be used to form the basis of the user's profile statistics (e.g., statistics which may include the user's average pause length based on a given video category), and may also serve as a data point for collaborative filtering to find a recommended optimal video pause speed for other users of the pause media playback program. However, the pause media playback program may optionally exclude a user's pause length which is determined to be greater than one standard deviation away from the user's average pause length (e.g., for instances where a user pauses the rendered video for reasons unrelated to caption readability).

For example, collaborative filtering may be used to take captured user behavior, which may be classified (e.g., by a data scientist and/or by an algorithm used to identify patterns) based on an aspect of the rendered video and/or the user behavior, and based on the classification, a recommendation may be made for future user behavior.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a pause media playback program 110a. The networked computer environment 100 may also include a server 112 that is enabled to run a pause media playback program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the pause media playback program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the pause media playback program 110a, 110b (respectively) to playing a video recording that includes captions, wherein each caption includes a textual transcription of an audio portion of the video, a description of non-speech elements of the video, or both. The pause media playback method is explained in more detail below with respect to FIG. 2.

Figure 2:
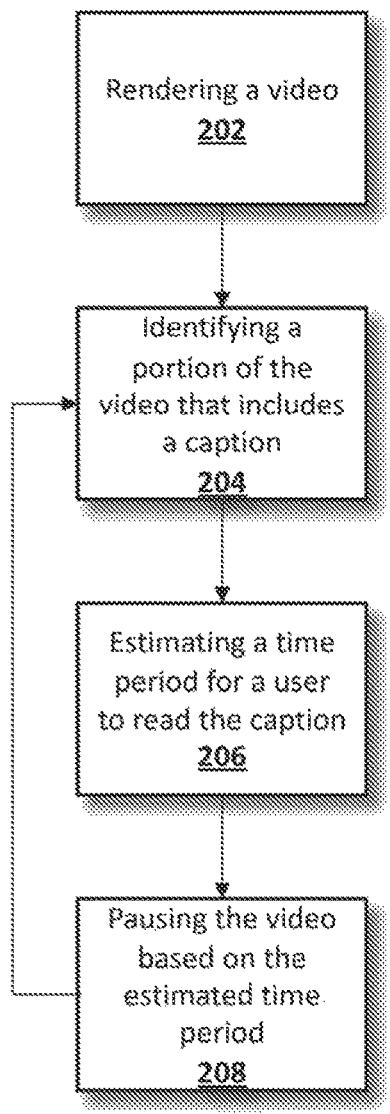
FIG. 2 is an operational flowchart illustrating a process for playing a video recording that includes captions according to at least one embodiment.

Referring now to FIG. 2, an operational flowchart illustrating the exemplary pause media playback process 200 used by the pause media playback program 110a and 110b according to at least one embodiment is depicted.

At 202, a video is rendered. Rendering a video may be a process by which a computer decodes information encoded in a data source to generate and display an image and/or a sound. The decoded information may include instructions (i.e., computer instructions) to produce and display the image and/or sound.

Closed captions of a rendered video may provide a textual transcription of the dialogue of the video footage (e.g., spoken words of characters, narrators, and/or other vocal participants), as well as textual descriptions of other portions of the rendered video (e.g., background noises, music playing, and/or other audio cues), which may altogether comprise the sound of the rendered video. The textual transcription may include, but is not limited to including, silent explanatory text, for example by using optical character recognition (OCR) techniques to convert the text in the scenery of the video, for example, to captioned/subtitled text (e.g., OCR may be used to convert a screen image such as a handwritten letter to text in instances where there may not be sufficient time for a viewer to read the text on the image).

Closed captions may be used to translate the rendered video from one language to another while preserving the sound of the video, and/or may be used for hearing impaired audiences wherein the sound of the video cannot be heard. Closed captions may also include narrative or explanatory text that is not based on text on the screen or on the audio in the video stream (e.g., background noises and/or other audience cues, among other things). In these instances, as well as others, the time in which it would take a user to read the closed captioned text may be too long for the time allotted for a video scene, and the user may desire to pause the video in order to read the closed captioned text. As will be described in more detail below, the pause media playback program 110a and 11b may learn a reading speed of the user (e.g., which may be based on comprehension and video content, among other things) based on the period for which a user pauses a video, among other things, including learned behaviors based on collaborative filtering techniques, and may automatically pause the video to permit the user to read the closed captioned text.

A rendered video may have closed captioned text which is in a different language than the audio of the video. In these instances, the length of a pause of the closed captioned text may take into account known language density ratios (e.g., the Spanish language may have 3.5 times more text than the Chinese language when conveying the same meaning).

At 204, a portion of the rendered video that includes a closed caption is identified. A closed caption may be prepared live, with a speech-to-text reporter transcribing spoken words and/or sounds into text which may be displayed simultaneously with the live video. A closed caption may also be prepared for prerecorded videos, whereby audio sounds (e.g., dialogue, etc.) may be transcribed and the captions may be prepared and positioned in advance. As described previously, closed captions may be automatically transcribed from silent text and/or an image of a handwritten letter, among other things. In these instances, closed captions may be used to capture nonverbal content which may be crucial to the plot of the video.

A closed caption may be identified based on the metadata of the rendered video. For example, closed captions may be encoded in the metadata of the rendered video such that the computer readable instructions indicate that closed captions are present. The pause media playback program 110a and 110b may utilize the computer readable instructions to identify that closed captions are present. For example, the text of a closed caption in a rendered video may be indexed in order to be searched by a computer running the pause media playback program 110a and 110b.

At 206, a time period within which a user can read the closed caption is estimated. Such a time period may be estimated based, for example, on a machine learning model (e.g., using collaborative filtering techniques in a recommender system) which may be trained with classified (e.g., labeled) user-specific data, and which may also be trained with data provided by other users who have a similar profile, among other data, and which may provide a weighted average of an amount of time it may take the user to read a closed caption, based on the average reading speed of the user and/or of a population of users with similar educational backgrounds and/or credentials as the user, among other things. The time period within which a user can read the closed caption may also be based on a number of words presented to a user as closed captioned text.

The use of collaborative filtering techniques in a recommender system may enable machine learning of a user's optimal pause length based on a comparison of the user's parameters (e.g., classifications) to those of other users and to the user's own pause history. Implementing a machine learning recommender system with collaborative filtering techniques, instead of using collaborative filtering techniques alone (e.g., outside of a connected machine learning system) may enable a user's past behavior to be used in the prediction of optimal pause lengths for the user and for future users.

A weighted average may be calculated by using the parameters of a user's profile. More specifically, an optimal pause value may be determined based on, among other things, a user's reading speed and/or a reading speed of a population of users (e.g., the population of users may be based on similar characteristics and/or parameters as the current user); a quantity of words in a closed caption; a native language of the user vs. a spoken language of the video; a language density variable (e.g., an information rate of a language or the amount of information conveyed per syllable, which may differ between languages and which may be a predetermined value configured within the pause media playback program 110a and 110b); and a user's area of expertise, including but not limited to an educational background of the user and/or a user's occupation (e.g., which may influence the user's ability to digest a certain type of information). Certain parameters may be more impactful than others, based on a determination of a system administrator (e.g., a user's area of expertise may be configured to take priority with respect to determining a user's reading speed of a given type of information) and may accordingly be given more weight.

For example, a German Physics PhD is watching a Chinese film on theoretical physics. There will be a language ratio for German (which is known to have very long words) versus Chinese (which is known to have single syllable words) that favors pausing (the value is determined to be 2.5, which means that a German subtitle takes 2.5 times longer to read than the same content presented in Chinese). However, the pause media playback program 110a and 110b determines that this physicist, with his PhD in physics, can absorb the information much faster than a non-physicist (assigning a further value of 0.5, based on the physicist's history in the pause media playback program 110a and 110b, which means that the physicist is able to read presented subtitles relating to physics in half the amount of time that it takes a lay person to read the same subtitle). The pause media playback program 110a and 110b uses these computed values, as well as the preconfigured indication that a user's area of expertise should be given a greater weight than other parameters (e.g., 60% of an optimal pause length should be based on this factor), to determine an optimal pause length. Thus, the 0.5 value will be weighed more heavily than the 2.5 value in this case.

As another example, the trained machine learning model of the pause media playback program 110a and 110b may gather user-specific data when the user manually pauses the rendered video for a period of 8 seconds to read a 20 word sentence. The pausing and unpausing of the rendered video by the user may be stored as input to the machine learning model. The trained machine learning model may also analyze data which the user has inputted into the user's profile (e.g., an educational background of the user, a field of expertise of the user, and/or one or more hobbies and/or interests of the user, among other things) and/or data which has been gathered by the user's connected online accounts, to determine a length of time for which the rendered video should be paused. In making such a determination, the trained machine learning model may take into consideration classifications of the rendered video and of the user, which may include, but are not limited to including, a genre of the rendered video, a specific content and sub-content (e.g., science and neuroscience), a spoken language of the user, whether the user has any education in the subject content and sub-content, and/or whether the content and sub-content are technical and/or information dense. A determination that the content and/or sub-content is technical and/or information dense may be made based on an initial classification of the content and/or sub-content by a data scientist (e.g., once neuroscience as a whole is classified as information dense, then all videos pertaining to neuroscience may likewise be information dense unless reclassified by a data scientist and/or another user and/or whether a user's manual pausing indicates that the video is not information dense).

Further, according to at least one embodiment, a determination that the content and/or sub-content of a closed caption is technical and/or information dense may also be made based on known methods for determining a difficulty in reading a passage of text (e.g., by using a Flesch-Kincaid Grade Level Formula).

A time period within which a user can read the closed caption may be estimated based on the user pausing the rendered video at the beginning of a closed caption and unpausing the rendered video at the end of the closed caption. According to various embodiments, when a user pauses a video at a portion of the video displaying a closed caption, the length of time the video is paused and text of the closed caption is captured and stored. This data captured when a video is paused may be collected for a video currently being watched by the user or for one or more videos previously watched by the user. In addition, this data captured when a video is paused may be collected for one or more videos that other users have watched. Data captured when a video is paused (including a length of time the video is paused and a text of the closed caption) may be input to a collaborative filtering machine learning model as training data.

As an example, Bob pauses a rendered video when an information dense video is displayed via closed captions over a certain amount of time. If the pause media playback program 110a and 110b determines that on average Bob pauses the rendered video for ten seconds per one hundred words, and for twenty-five seconds for one hundred technically oriented words, given the specific density of the information being presented, then the pause media playback program 110a and 110b will automatically pause playback of the rendered video accordingly and will also use the determined pause length as data to feed back into the machine learning algorithm and to update Bob's user profile.

Despite the pause media playback program's 110a and 110b determined time period, the user may manually pause or play the playback of the rendered video in order to read the closed caption at a rate which is faster or slower than a determined rate. In this instance, the length of the pause and the classifications of the rendered video may be fed back into the pause media playback program 110a and 110b for further tailoring of the machine learning model.

At 212, the rendered video is paused based on the second estimated time period. Based on the user profile (e.g., which includes details on a user's reading speed, education level, and/or native language, among other things, including whether the user speaks slower than a native speaker), machine learned adaptive reading speed adjustment), content classification (e.g., scientific text and technical documentaries may be more information dense than a casual descriptive narrative, so text classification may be important to determining a pause length and/or pause placement), and known language density ratios (e.g., some languages may be more or less information dense than others including having shorter and/or longer words which may be presented to the user to read), the rendered video may be automatically paused to adapt the rate of consumption of the closed captioned text.

Based on interactions of the user, as detected by the pause media playback program 110a and 110b and/or as detected by connected online accounts, for example, based on a reading speed of the user as noted by the user's Kindle (Kindle is a trademark or registered trademark of Amazon Technologies, Inc.) account, the pause media playback program 110a and 110b may pause the rendered video for a time period within which the pause media playback program 110a and 110b estimates the user will need to read the closed captioned text.

The pause media playback program 110a and 110b may identify static portions of the rendered video action, if any, and may try to utilize the static portions by pausing the closed captions at the static portion of the rendered video in order to make the pause less intrusive. The pause media playback program 110a and 110b may also distribute the pause throughout the rendered video by adjusting the sound and/or lip synched dialogs so that they may be less affected.

The pause media playback program 110a and 110b may loop back to step 204, described in detail above, to identify another portion of the rendered video which includes another closed caption. This may continue until no additional closed captions are identified and/or until the rendered video ends. As described previously with respect to step 204 above, a closed caption may be identified based on the metadata of the rendered video, and a second closed caption may be identified which appears later in time in the rendered video than the first closed caption.

Similarly, a second time period within which the user can read the second closed caption may be estimated. Based on the time period within which the user was able to read the first closed caption (or a previously identified closed caption), the classification(s) of the video, and the length of the next identified closed caption, the pause media playback program 110a and 110b may determine a time period within which the user can read the second (or next identified) closed caption.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
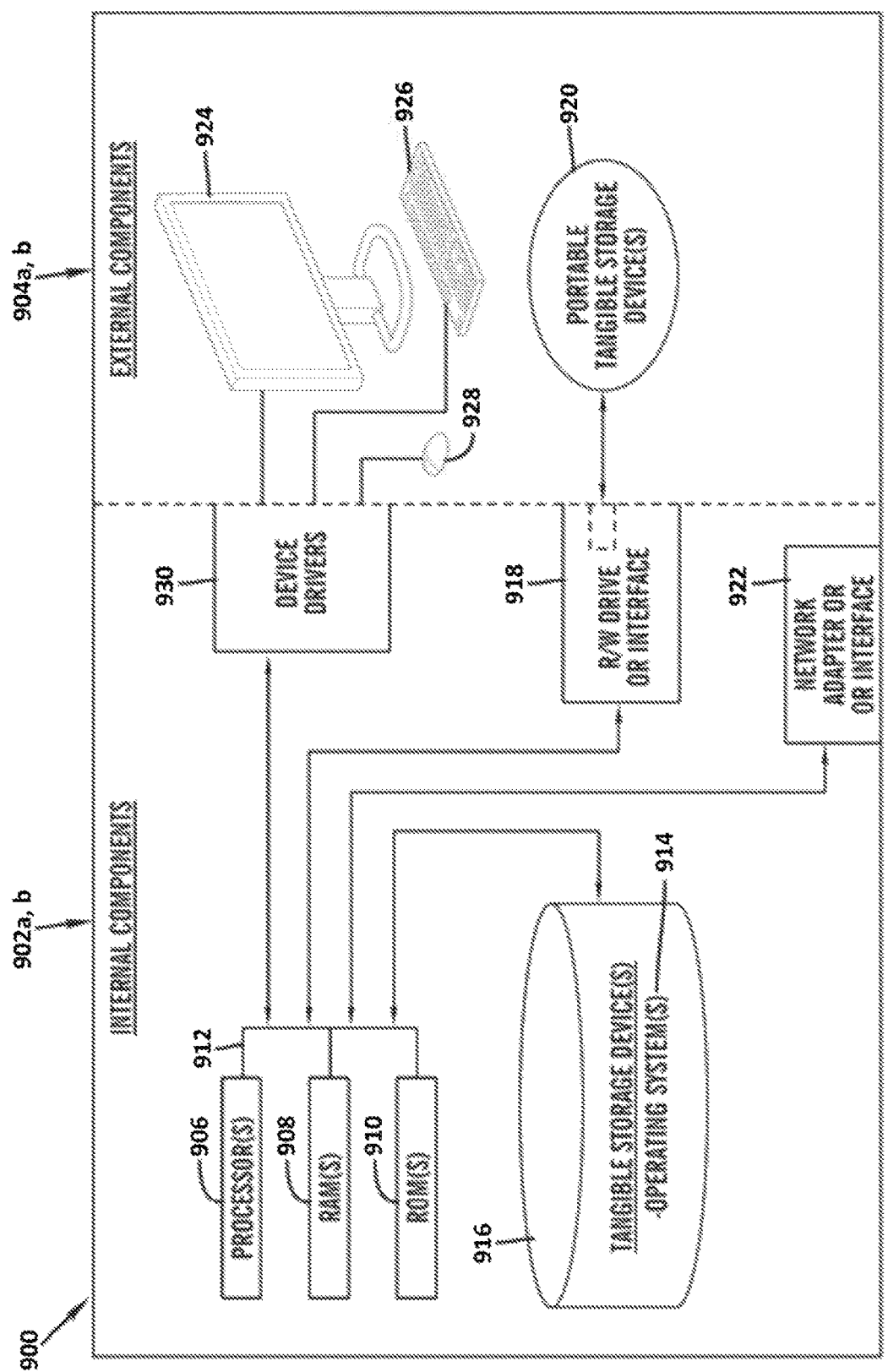
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the pause media playback program 110a in client computer 102, and the pause media playback program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the pause media playback program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the pause media playback program 110a in client computer 102 and the pause media playback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the pause media playback program 110a in client computer 102 and the pause media playback program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
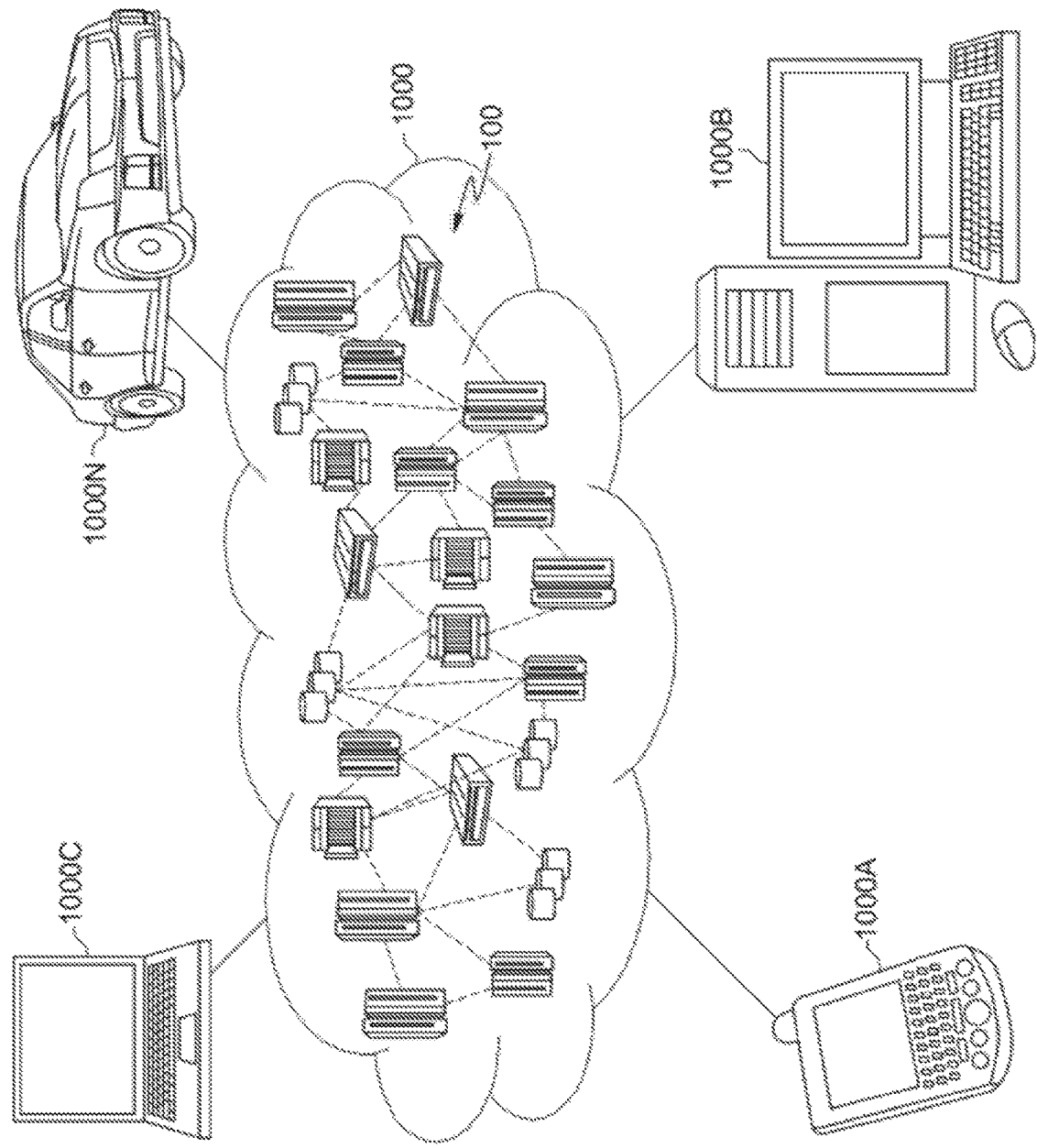
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
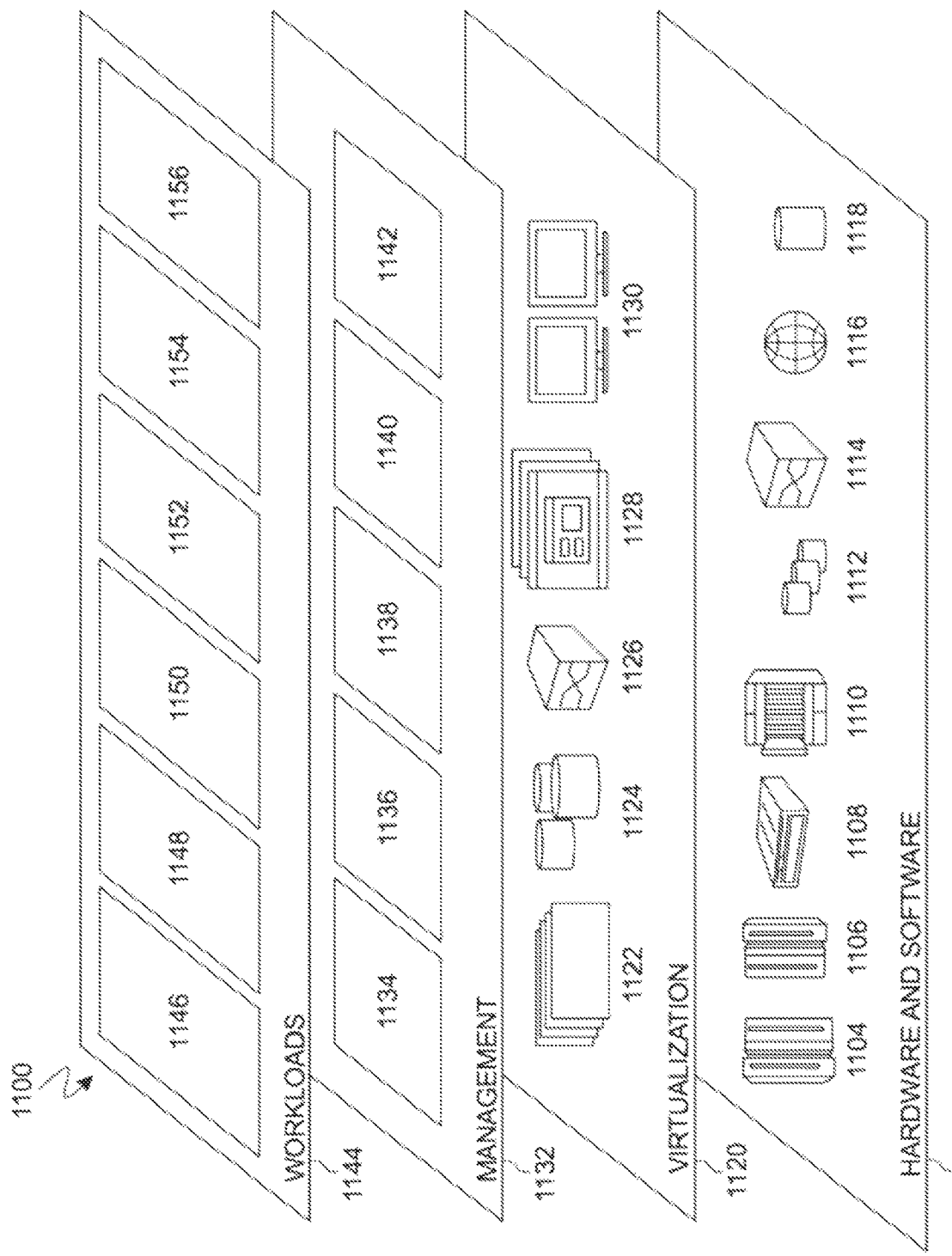
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and pause media playback 1156. A pause media playback program 110*a*, 110*b* provides a way to play a video recording that includes captions, wherein each caption includes a textual transcription of an audio portion of the video, a description of non-speech elements of the video, or both.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for playing a video recording that includes captions, wherein each caption includes a textual transcription of an audio portion of the video, a description of non-speech elements of the video, or both, the method comprising:
rendering the video;
identifying a first portion of the video that includes a first caption, wherein the first caption is rendered during the first portion and a first time period is required for rendering the first portion;
in response to identifying the first portion of the video, estimating a second time period for a particular user to read and understand text in the first caption based on a machine learning model trained on a reading speed of the particular user, with a user providing feedback input to the model by manually pausing training videos, wherein the machine learning model uses collaborative filtering to estimate the second time period;
determining whether the second time period for the particular user to read and understand text in the first caption is greater than the first time period for rendering the first portion of the video;
in response to determining that the second time period is greater than the first time period, pausing the video for a third time period, wherein the third time period is at least as long as a difference between the first and second time periods, thereby improving the particular user's comprehension of the video.

2. The method of claim 1, wherein estimating the second time period for the particular user to read and understand text in the first caption is based on a weighted average of one or more of the following variables:
a quantity of words in the first caption,
a reading speed of a population of users,
a reading speed of the particular user, and
a language density variable for a language spoken in the video recording.

3. The method of claim 1, wherein the reading speed of the particular user is determined by data generated by a connected online account.

4. The method of claim 1, further comprising resuming rendering the video at the end of the third time period.

5. The method of claim 1, wherein estimating the second time period for the particular user to read and understand text in the first caption is further based on a content classification.

6. A computer system for playing a video recording that includes captions, wherein each caption includes a textual transcription of an audio portion of the video, a description of non-speech elements of the video, or both, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
rendering the video;
identifying a first portion of the video that includes a first caption, wherein the first caption is rendered during the first portion and a first time period is required for rendering the first portion;
in response to identifying the first portion of the video, estimating a second time period for a particular user to read and understand text in the first caption based on a machine learning model trained on a reading speed of the particular user, with a user providing feedback input to the model by manually pausing training videos, wherein the machine learning model uses collaborative filtering to estimate the second time period;
determining whether the second time period for the particular user to read and understand text in the first caption is greater than the first time period for rendering the first portion of the video;
in response to determining that the second time period is greater than the first time period, pausing the video for a third time period, wherein the third time period is at least as long as a difference between the first and second time periods, thereby improving the particular user's comprehension of the video.

7. The computer system of claim 6, wherein estimating the second time period for the particular user to read and understand text in the first caption is based on a weighted average of one or more of the following variables:
a quantity of words in the first caption,
a reading speed of a population of users,
a reading speed of the particular user, and
a language density variable for a language spoken in the video recording.

8. The computer system of claim 6, wherein the reading speed of the particular user is determined by data generated by a connected online account.

9. The computer system of claim 6, further comprising resuming rendering the video at the end of the third time period.

10. The computer system of claim 6, wherein estimating the second time period for the particular user to read and understand text in the first caption is further based on a content classification.

11. A computer program product for playing a video recording that includes captions, wherein each caption includes a textual transcription of an audio portion of the video, a description of non-speech elements of the video, or both, comprising:
one or more non-transitory computer-readable storage media and program instructions stored on at least one of the one or more tangible storage media, the program instructions executable by a processor to cause the processor to perform a method comprising:
rendering the video;
identifying a first portion of the video that includes a first caption, wherein the first caption is rendered during the first portion and a first time period is required for rendering the first portion;
in response to identifying the first portion of the video, estimating a second time period for a particular user to read and understand text in the first caption based on a machine learning model trained on a reading speed of the particular user, with a user providing feedback input to the model by manually pausing training videos, wherein the machine learning model uses collaborative filtering to estimate the second time period;

determining whether the second time period for the particular user to read and understand text in the first caption is greater than the first time period for rendering the first portion of the video;

in response to determining that the second time period is greater than the first time period, pausing the video for a third time period, wherein the third time period is at least as long as a difference between the first and second time periods, thereby improving the particular user's comprehension of the video.

12. The computer program product of claim 11, wherein estimating the second time period for the particular user to read and understand text in the first caption is based on a weighted average of one or more of the following variables:

a quantity of words in the first caption, a reading speed of a population of users, a reading speed of the particular user, and a language density variable for a language spoken in the video recording.

13. The computer program product of claim 11, wherein the reading speed of the particular user is determined by data generated by a connected online account.

14. The computer program product of claim 11, further comprising resuming rendering the video at the end of the third time period.

\* \* \* \* \*